United States Patent [19]
Hirai

[11] Patent Number: 5,755,952
[45] Date of Patent: May 26, 1998

[54] METHOD OF ACTIVATING A MATERIAL TO BE ACTIVATED FOR ADSORBENT

[75] Inventor: Yoji Hirai, Omiya, Japan

[73] Assignee: Heiyo Shoji Kabushiki Kaisha, Shizuoka, Japan

[21] Appl. No.: 573,024

[22] Filed: Dec. 15, 1995

[30] Foreign Application Priority Data

Dec. 16, 1994 [JP] Japan ................... 6-339428

[51] Int. Cl.$^6$ ......................................... F27D 3/00
[52] U.S. Cl. ................. 205/768; 502/5; 502/514; 375/109
[58] Field of Search .................. 205/768; 502/5, 502/514, 400; 375/109

[56] References Cited

U.S. PATENT DOCUMENTS

| | | | |
|---|---|---|---|
| 4,261,857 | 4/1981 | Nakao | 252/420 |
| 5,211,929 | 5/1993 | Durand et al. | 423/717 |
| 5,312,599 | 5/1994 | Schwartz, Jr. | 422/209 |
| 5,406,582 | 4/1995 | du Plessis | 373/115 |

Primary Examiner—Arun S. Phasge
Attorney, Agent, or Firm—Oldham & Oldham Co., LPA

[57] ABSTRACT

The method is practiced such that the material is alternately repeatedly placed in low temperature and high temperature active gas atmospheres, the material is subjected to low temperature contraction and high temperature expansion due to the endothermic reaction of active gas, and a part of the active gas adhesively adsorbed to the material during low temperature contraction is detached from the material due to high temperature expansion.

12 Claims, 5 Drawing Sheets

METHOD OF ACTIVATING A MATERIAL TO BE ACTIVATED FOR ADSORBENT

BACKGROUND OF THE INVENTION

The present invention relates generally to a method of activating a material to be activated usable for an adsorbent. More particularly, the present invention relates to improvement of a method of activating a material to be activated usable as an adsorbent Conventionally, a material to be activated usable for an adsorbent is exemplified by cellulose based material, acrylonitrile based synthesized material, lignin, pitch, phenol based material, coal, plant or their carbide and zeolite.

As a method of activating a material to be activated (hereinafter referred to as material), a method of allowing steam and carbon dioxide or their mixed gas (hereinafter referred to as active gas) to act on the material at a predetermined temperature so as to activate the material, and a method of dry-distilling a carbon based raw material or a used active carbon, and thereafter, feeding electricity to it in a steam sprayed atmosphere to activate a active carbon (see an official gazette of Japanese Patent Laid-Open Publication NO. 4-97905) are known.

With the conventional method having active gas used therefor, since an adsorbing ability of the material is in proportion to an activating time and a yielding rate of the same is in inverse proportion to the activating time, an active reacting time is elongated to obtain the material having high adsorbing ability but a yielding rate is reduced.

SUMMARY OF THE INVENTION

The present invention has been made in consideration of the aforementioned background.

An object of the present invention is to provide a method of activating a material to be activated usable for an adsorbent wherein the material having a high adsorbing ability can be obtained for a short period of activating time.

According to the present invention, there is provided a method of activating a material to be activated usable for an adsorbent wherein the material is alternately repeatedly placed in low temperature and high temperature active gas atmospheres, the material is subjected to low temperature contraction and high temperature expansion due to an endothermic reaction of the active gas, and a part of the active gas adhesively adsorbed to the material during the low temperature contraction of the material is detached from the material by the high temperature expansion.

Low and high temperature atmospheres can be obtained by alternately repeatedly blowing low temperature and high temperature active gases.

Low temperature and high temperature atmospheres are obtained by arranging a low temperature reaction chamber into which low temperature active gas is blown and a high temperature reaction chamber into which high temperature active gas is blown.

Heating is effected from the outside. Otherwise, heating is effected by feeding electricity to the material in the high temperature reaction chamber to raise up temperature by the electric resistance of the material.

Electricity is fed to the material from the outside, heating is effected by temperature rise induced by the electric resistance of the material, and thereafter, the feeding of electricity is interrupted so as to allow the temperature of the material to be lowered by endothermic reaction of the active gas.

Cellose based material, acrylonitrile based synthesized material, lignin, pitch, asphalt phenol based material, coal, plant and their carbide can be used as a material to be activated.

In addition, zeolite can be used as a material to be activated.

Generally, steam, carbon dioxide or their mixture is used as an active gas.

The heating for the high temperature reaction chamber from the outside is not limited to specific means, and an electric heater, electromagnetic heating, high frequency heating or radiative heating or the like can be used.

It is desirable that the differential temperature between a low temperature and a high temperature of the active gas to be alternately repeatedly used is set to 100° C. or more.

As an apparatus for practicing the method of activating a material to be activated usable for an adsorbent according to the present invention, a fluidized layer type furnace, a rotary kiln or a box type furnace can be noted, and it is selected depending on the kind of a material to be activated.

With respect to a function effective for a material to be activated by practicing the method of activating a material to be activated usable for an adsorbent according to the present invention, it is considered that the following concept is applicable.

A main component constituting the material to be activated is one or a combination among C, H, O, N, S, $(C_6H_{10}O_5)_n$, $(C_3H_3N)_n$, $[\{C_6H_5(OH)(CH_2)]_n$, $W_m$, $Z_n$, $O_{2n}$, $H_2O$ or the like.

Reaction of these components in the furnace is represented by the following chemical formulas,

$C+H_2O \rightarrow CO+H_2 -31.14$ Kcal $C+CO_2 \rightarrow 2CO -40.78$ Kcal $C+O_2 \rightarrow CO_2 +94.03$ Kcal $C+\frac{1}{2}O_2 \rightarrow C)+26.62$ Kcal All of these reactions take place after $H_2O$, $CO_2$ and $O_2$ are once adsorbed to the material to be activated, and the adsorption is liable to occur when the temperature in the furnace is kept high and detaching is liable to occur when the temperature in the furnace is kept low. When the material is repeatedly placed in active gas at the low temperature and as well as at the high temperature; the active gas is adsorbed to fine holes on the material having a low temperature with a probability as high as ten times or more compared with the material having a high temperature; and when the material having a low temperature is heated to reach an elevated temperature, a part of the active gas is detached from the material due to high temperature expansion so that activation is promoted by way of adsorbing→detaching→adsorbing . . . . Consequently, an activating period of time is substantially shortened and the material having high adsorbing ability can be obtained.

Figure 5:
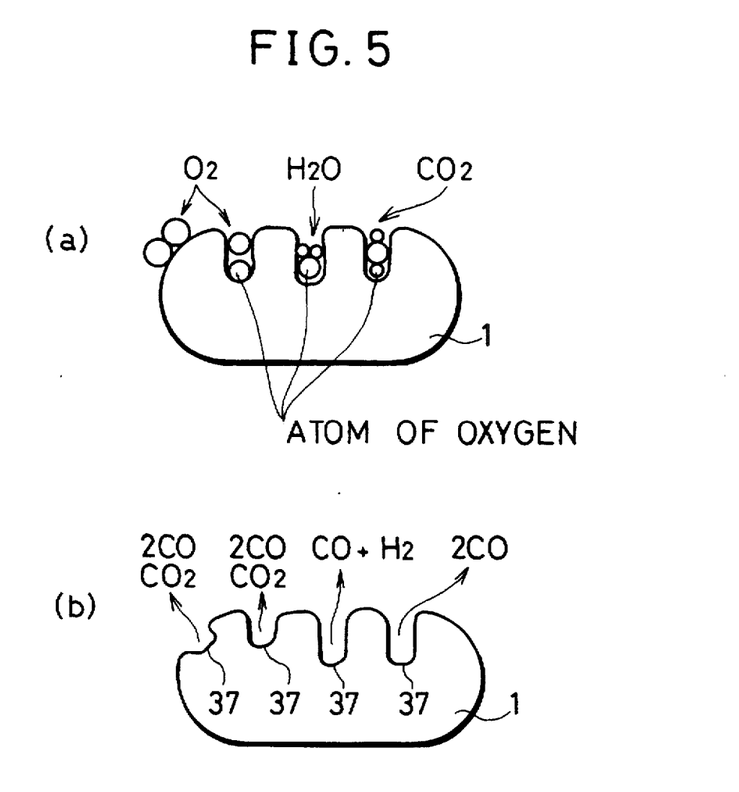

FIG. 5 schematically shows the reaction of a material 1 on active gas. As shown in FIG. 5(a), at the time of low temperature contraction, $H_2O$; $CO_3$ and $O_2$ are adsorbed to the material 1; while as shown in FIG. 5(b), at the time of high temperature expansion; CO, $CO_2$, $CO+H_2$ are detached from the material 1; causing a large number of fine holes 37 to be left behind. Thus, activation is promoted with the fine holes 37.

To place the material in active gas by repeating low temperature and high temperature; a measure is taken such that low temperature and high temperature active gas is alternately repeatedly blown or a low temperature reaction chamber into which low temperature active gas is blown and a high temperature active chamber into which high temperature active gas is blown are arranged, or electricity is fed to the material from the outside to effect heating by temperature rise. and thereafter, feeding of electricity is interrupted so as to allow the temperature to be lowered. However, by selecting the measure depending on the kind of the material, the material having a high adsorbing ability can be obtained at a high efficiency.

BRIEF DESCRIPTION OF THE DRAWINGS

The present invention is illustrated in the following drawings in which:

FIGS. 5(a) and (b) are schematic views which show reactions of a material to be activated with active gas during contraction at a lower temperature as well as during expansion at a higher temperature when the activating method of the present invention is employed.

DESCRIPTION OF THE PREFERRED EMBODIMENTS

The present invention will now be described in detail hereinafter with reference to the accompanying drawings which illustrate a few preferred embodiments thereof.

Figure 1:
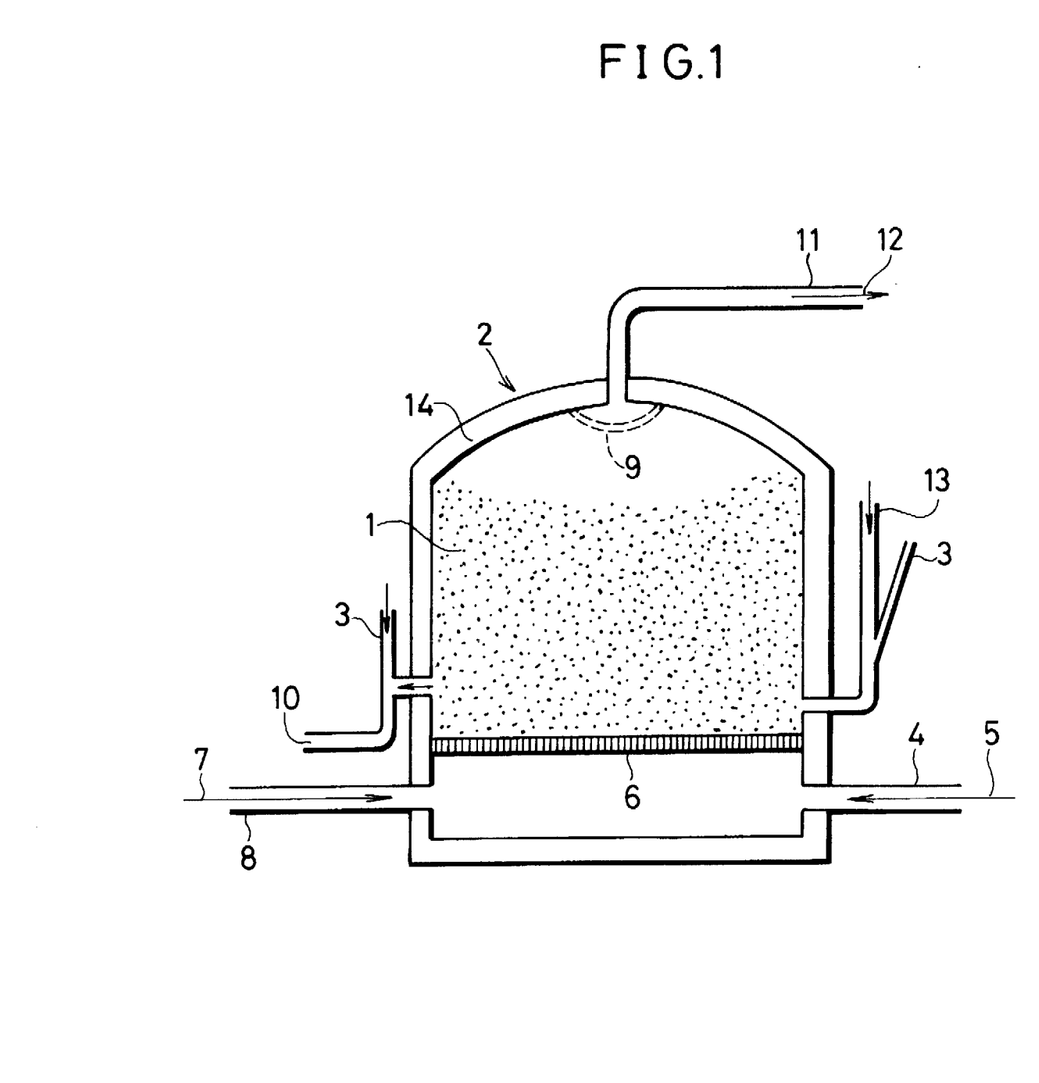
FIG. 1 is a schematic sectional view which shows by way of example the structure of a fluidized layer type furnace for which an activating method of the present invention is employed.

In FIG. 1, a reactive chamber 2 of a fluidized layer type furnace is composed of a lower cylindrical furnace wall 14 subsequent to an upper spherical furnace wall, an exhaust tube 11 fixed to the upper part of the furnace wall 14, an inlet tube 13 for introducing a material 1 which is not treated into the lower part of the furnace wall 14, a discharge tube 10 for discharging the material 1 which is subjected to activating treatment, a low temperature gas tube 4 for introducing low temperature active gas 5 into the lower part of the furnace wall 14, a high temperature gas tube 8 for introducing high temperature gas 7 into the lower part of the furnace wall 14, a partition lattice 6 located between the inlet tube 13 and gas tubes 4 and 8 to horizontally extend within the furnace wall 14; a mask 9 for covering an intake port of the exhaust tube 11 at the top of the furnace wall 14, and steam tubes 3 located at the position in the vicinity of terminal end of the inlet tube 13 and at the position in the vicinity of an outlet of the outlet tube 10.

After a high temperature atmosphere of 1000° C. is maintained for a predetermined time by blowing high temperature active gas 7 from the high temperature gas tube 8 through the partition wall 6, a low temperature gas tube 4 is closed, causing a low temperature atmosphere of 800° C. to be maintained for a predetermined time by blowing low temperature active gas 5 from the low temperature gas tube 4 through the partition lattice 6. By repeating this process; a material 1 received in the reaction chamber 2 is alternately repeatedly placed in a high temperature atmosphere and a low temperature atmosphere.

In this case. the material 1 placed in the high temperature atmosphere is heated to 900° C. while it is fluidized to cause expansion detaching reaction. After the material 1 is maintained for a predetermined period, it is placed in the low temperature atmosphere and it is cooled from 900° C. to 800° C. in the fluidizing state to cause contraction adsorbing reaction so that activation proceeds, and the material 1 is maintained for a predetermined time. Subsequently, when the interior of the reaction chamber 2 is filled with high temperature atmosphere by practicing the same process, the material 1 is expanded to release the active gas adsorbed in the material, thereafter, the material is alternately repeatedly maintained in the high temperature atmosphere and the low temperature atmosphere in the same manner as mentioned above so that activation is promoted.

Feeding of the material 1 in the reaction chamber 2 is achieved by blowing pressurized steam to untreated material 1 in the inlet tube 13, while discharging of the material 1 outside of the reaction chamber 2 is achieved by blowing treated material 1 by pressurized steam introduced into the steam tubes 3 of the inlet tube 13 and the discharge tube 10. In the case that a material 1 to be activated is fibrous material, its feeding and discharging are not achieved by the aforementioned apparatus but they are achieved by operating a roller conveyer or the like.

The high temperature and low temperature active gas is filtered by the mask 9 and then discharged through an exhaust tube 11.

The repeating time when the high temperature atmosphere and the low temperature atmosphere are alternately repeated for activating the material 1 is selectively determined depending on the shape and the kind of the material 1, and it is desirable that the repeating time is set to 1 to 3 minutes in the case that the material 1 has a grain size of 4 to 30 meshes.

Activation of the material 1 by employing the foregoing method can be attained at a speed as fast as three to 10 times that in the conventional method.

Figure 2:
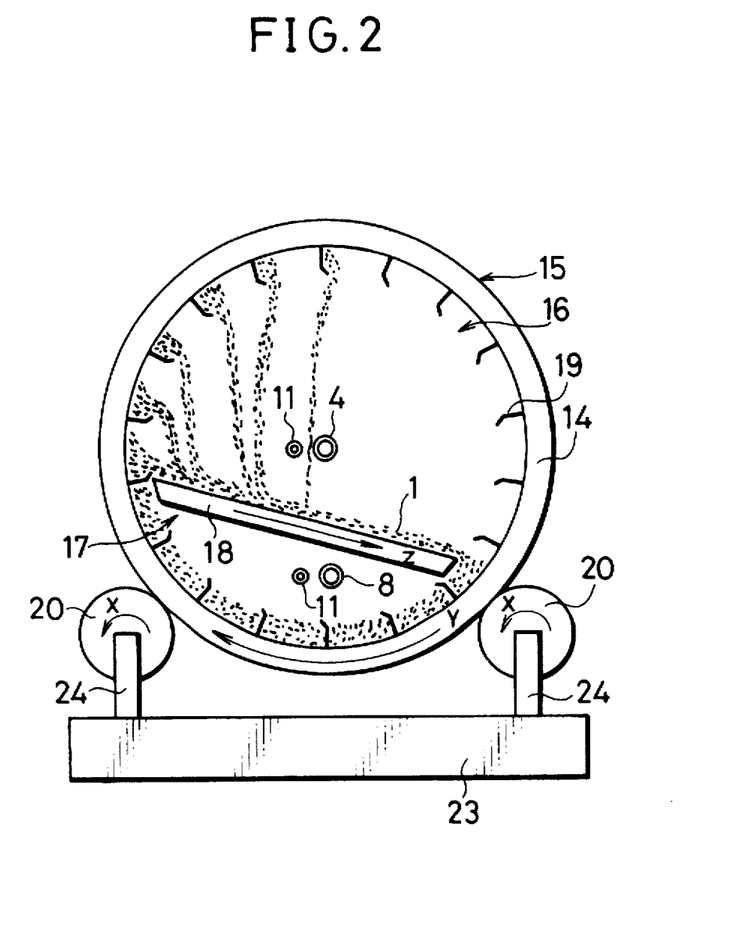
FIG. 2 is a sectional front view which shows by way of example the structure of a rotary kiln for which the activating method of the present invention.

In FIG. 2, a rotary kiln 15 is composed of a cylindrical furnace wall 14 placed on two cylindrical rotors 20 supported by supporting arms 24 on a base board 23 to be rotated in the Y arrow-marked direction, i.e., in the direction of rotation of the kiln by a driving power source (not shown), a plurality of scooping blades 19 disposed in the equally spaced relationship around the inner wall surface of the furnace wall 14 with their foremost ends bent suitably for a scooping operation, a partition wall 18 immovably held with slight gradient independently of the rotation of the furnace wall 14 to separate the interior of the furnace wall 14 into a lower temperature reaction chamber 16 and an upper lower temperature reaction chamber 17; a low temperature gas tube 4 and an exhaust tube 11 communicated with the low temperature reaction chamber 16, and a high temperature gas tube 8 and a discharge tube 11 communicated with the high temperature reaction chamber 17. The gradient of the partition plate 18 is set to a minimum value which makes it possible that a material 1 to be activated in the low temperature reaction chamber 16 to move in the Z arrow-marked direction.

In an activating method having the rotary kiln 5 used therefor, the high temperature reaction chamber 17 defined by the furnace wall 14 and the partition plate 18 is normally maintained in a high temperature atmosphere of 1000° C. by high temperature gas blown from the high temperature gas tube 8. On the other hand, the low temperature reaction chamber 16 is normally maintained in a low temperature atmosphere of 800° C. by low temperature gas blown from the low temperature gas tube 4.

In practice, the material 1 in the high temperature reaction chamber 17 is heated to 900° C. by the high temperature atmosphere, and as the rotary kiln 15 in rotated in the Y arrow-marked direction, the material 1 is scooped up by the scooping blades 19 from the high temperature reaction chamber 17 to the low temperature reaction chamber 16 while causing expansion detaching reaction. As the scooping blades 19 are raised up, the material falls down on the upstream side of the partition plate 18, and it moves along the partition plate 18, and after it reaches the lower end of the partition plate 18, it is displaced to the high temperature reaction chamber 17 as it is scooped down by the scooping blades 19.

In this case, while the material moves from the scooping blades 19 in the low temperature reaction chamber 16 to the lower end of the partition plate 18, the temperature of the material 1 is lowered to 800° C. due to the endothermic reaction caused by the low temperature active gas in the low temperature reaction chamber 16 and the material 1 so that activation proceeds. As the furnace wall 14 is rotated in the Y arrow-marked direction, high temperature expansion detaching reaction and low temperature contraction adsorbing reaction are repeatedly caused with the material 1 so that activation is promoted.

Feeding of the material 1 in the reaction chamber and discharging of the material 1 from the reaction chamber are achieved by a conventional screw conveyer or the like.

Exhausting of the high and low active gases is performed through the exhaust tube 11.

The repeating time when the high temperature and low temperature atmosphere are alternately repeated for activating the material 1 and the speed of activation are same as those in the case that the fluidized layer type furnace shown in FIG. 1 is used.

Figure 3:
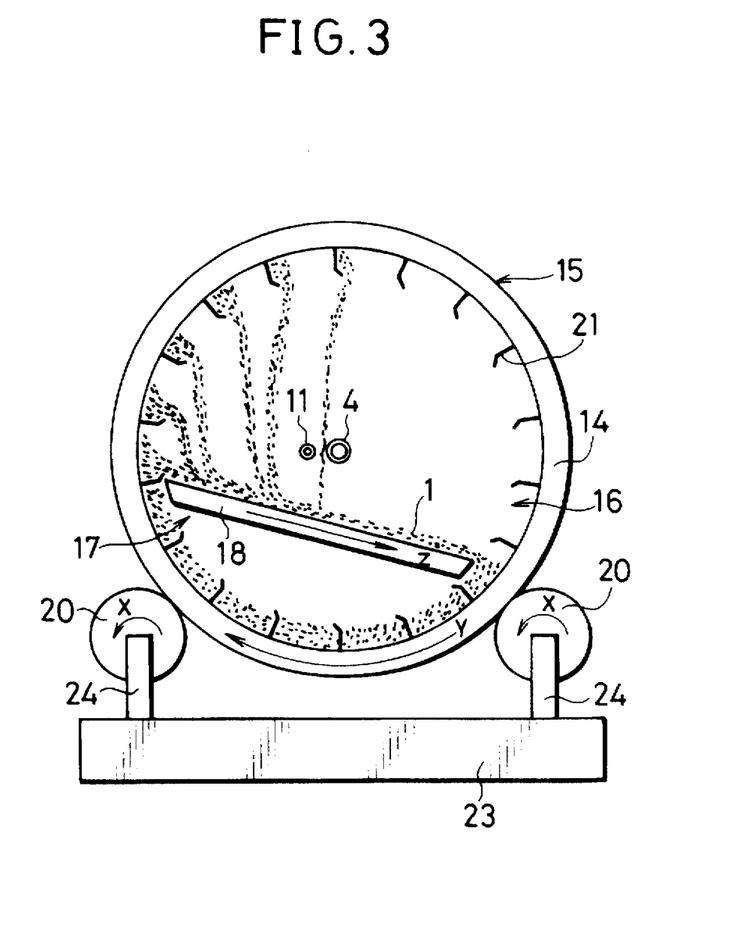
FIG. 3 is a sectional front view which shows by way of another example the structure of a rotary kiln for which the activating method of the present invention is employed.

In FIG. 3, a rotary kiln 15 has the same structure of the rotary kiln 15 described with reference to FIG. 2 with the exception that the high temperature gas tube and the exhaust tube in the high temperature reaction chamber are omitted and the scooping blades are modified in electric conductive scooping blades to which electricity is fed from outside for heating the material by electric resistance of the material itself (same components as those in FIG. 2 are represented by same reference numerals).

The material 1 having certain electric conductivity in a high temperature reaction chamber 17 is heated to 900° C. by heat generation caused by the electric resistance of the material 1 with electricity conducted via the electric scooping blade 21, and as the furnace wall 14 is rotated in the Y arrow-marked direction, the material 1 is scooped up from the high temperature reaction chamber 17 to the low temperature reaction chamber 16 while causing expansion detaching reaction, As the electric conductive scooping blades 21 are raised up, the material 1 falls down on the upstream side of the partition plate 18 and moves along the gradient of the partition plate 18 in the Z arrow-marked direction. After the material 1 reaches the lowermost end of the partition plate 18, it is displaced to the high temperature reaction chamber 17 by scooping down by the lowering empty electric conductive scooping blades 21.

In this case, while the material 1 moves from the electric conductive scooping blade 21 to the lowermost end of the partition plate 18, the temperature is lowered to 800° C. by the endothermic reaction caused between the low temperature active gas in the low temperature reaction chamber 16 and the material 1 so that activation proceeds. As the furnace wall 14 is rotated in the Y arrow-marked direction, since high temperature expansion detaching reaction and low temperature contraction adsorbing reaction are repeatedly caused with the material 1, activation is promoted.

In addition, feeding of the material 1 to the reaction chamber and discharging of the material 1 from the reaction chamber, exhausting of the high temperature and low temperature gases and repeating time and speed for the activation of the material 1 are same as those in the rotary kiln shown in FIG. 2.

Figure 4:
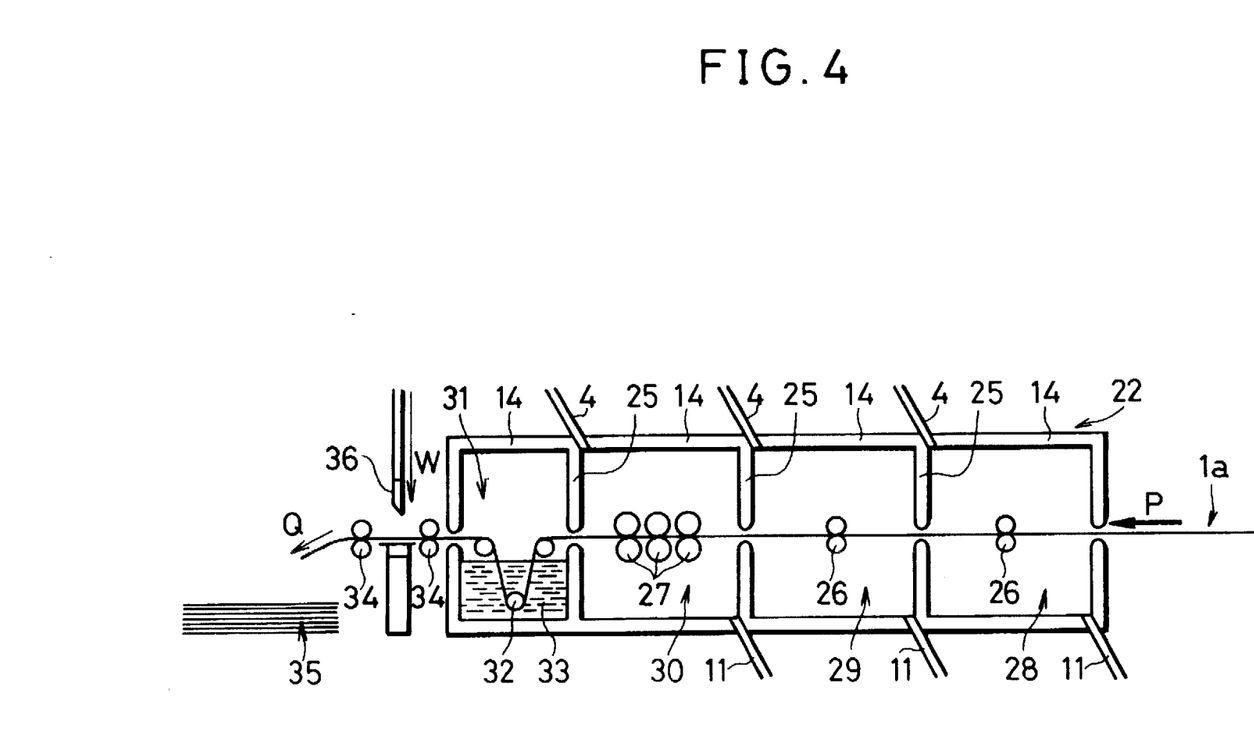
FIG. 4 is a sectional view which shows by way of example a box type furnace for which the activating method of the present invention is employed.

In FIG. 4, a box type furnace 22 is constructed such that a primary carbonizing reaction chamber 28, a secondary carbonizing reaction chamber 29, an active reaction chamber 30 and a water bath chamber 31 are arranged one after another from the upstream side while each chamber is separated by furnace walls 14 and partition walls 24 from adjacent chamber. An opposing pair of feeding rollers 26 are arranged in the primary carbonizing reaction chamber 28, an opposing pair of feeding rollers 26 are arranged in the secondary carbonizing reaction chamber 29, plural pair of electric conductive rollers 27 are arranged in the active reaction chamber 30 and the water bath chamber 31 is filled with water. Two guide rollers 32 are disposed on the upper surface of water 33 and a single guide roller 32 is disposed in the water 13 of the water bath chamber 31, and two pair of delivering rollers 34 are disposed on the downstream side of the water bath chamber 31 with a distance held therebetween. Nip surfaces of the respective rollers are arranged on a common horizontal surface. A cutter 36 adapted to be displaced in the W arrow-marked direction is arranged between the deliver rollers 34. Low temperature gas tubes 4 for feeding and blowing low temperature active gas from the outside and exhaust tubes 11 for discharging waste gas are attached to the primary carbonizing reaction chamber 28, the secondary carbonizing reaction chamber 29 and the active reaction chamber 30.

To practice an activating method with the box type furnace 22, the primary carbonating reaction chamber 28 is maintained in an atmosphere of 300° to 400° C. with low temperature active gas blown from the low temperature gas tube 4, the secondary carbonizing reaction chamber 29 is maintained in an atmosphere of 500° to 700° C. with low temperature active gas blown from the low temperature gas tube 4, and the active reaction chamber 30 is maintained in an atmosphere of 800° C. with low temperature gas blown from the low temperature gas tube 4.

A fibrous material 1a to be activated is fed by the feeding roller 26 from the upstream side of the primary carbonizing reaction chamber 28 in the P arrow-marked direction, and the fibrous material 1a maintained in the atmosphere of 300° to 400° C. induces primary thermal decomposition such as dewartering, deoxidization or the like. Next, the fibrous material is fed from the upstream side of the secondary carbonizing reaction chamber 29 by the feeding rollers 26 so that it is held in an atmosphere of 500° to 700° C. to be carbonized, whereby fibrous carbide having a predetermined electric conductivity is obtained.

The fibrous material 1a carbonized in the secondary carbonizing reaction chamber 29 is fed to the active reaction chamber 30 by the feeding roller 26 from the downstream side of the secondary carbonizing reaction chamber 29, and while it passes through plural pairs of electricity feeding rollers 27, it is heated to 900° C. by heat generated by the resistance of the fibrous material to cause an expansion detaching reaction. After the heat generated by the electric resistance is maintained for a predetermined time, feeding of electricity to the electricity feeding rollers 27 is interrupted so that the temperature of the fibrous material 1a is lowered to 800° C. due to the endothermic reaction induced with low temperature active gas in the active reaction chamber 30; whereby contraction adsorbing reaction is caused to promote activation.

Subsequently, the fibrous material 1a is cooled in water 33 in the water bath chamber 31 with the aid of the guide rollers 32, and thereafter, it is discharged by the delivering rollers 34. While the fibrous material 1a is discharged in that way, a cutter 36 is displaced in the W arrow-marked direction every discharging of the fibrous material 1a by a predetermined length so that an active fibrous product 35 having a constant length is obtained and discharged in the Q arrow-marked direction to form a laminated structure of the active fibrous product 35.

Cooling of the fibrous material 1a should not be limited only to water cooling. Alternatively, the fibrous material 1a may be cooled by blowing low temperature inert gas.

It is desirable that the repeating time when the reaction of causing the temperature of the atmosphere to be lowered due to interruption of the feeding of electricity after the fibrous material 1a is expanded by heat generated by electrical resistance to activate the fibrous material 1a, and then causing the fibrous material 1a to adsorb active gas allowing it to be contracted is set within 30 minutes.

Activation by employing this method can be achieved at a speed as fast as three times or more of the conventional method to be practiced at a predetermined temperature.

When the method of activating a material to be activated usable for an adsorbent according to the present invention is employed, the activating time can remarkably be shortened, and the material having high adsorbing ability can be obtained.

In addition, when the method of the present invention is employed, the material having high adsorbing ability can be obtained at a high efficiency by selecting one, of various methods of repeatedly placing the material at the low and high temperatures, depending on the kind of the material to be activated.

While the present invention has been described with respect to four preferred embodiments thereof, it should be understood that the present invention should not be limited only to these embodiments but various change or modification may be made with departure from the scope of the present invention as defined by the appended claims.

What is claimed is:

1. A method of activating a material to be activated usable for an adsorbent, comprising the steps;
    alternatively and repeatedly placing said material in a relatively low temperature atmosphere in which said material contracts and a relatively high temperature atmosphere in which the material expands, said contraction and expansion occurring due to endothermic reaction of said material with an active gas introduced in said atmosphere, and
    allowing a part of said active gas adhesively adsorbed to said material during said low temperature contraction of said material to be detached from said material by said high temperature expansion.

2. A method of activating a material as claimed in claim 1, wherein activating of said material is achieved by using a fluidized bed type furnace which includes a cylindrical furnace wall, an exhaust tube fixed to the upper part of said furnace wall, an inlet tube for introducing a material which is not treated into the lower part of said furnace wall, a discharge tube for discharging the material after being subjected to activating treatment, a low temperature gas tube for introducing a relatively low temperature active gas into the lower part of said furnace wall, a high temperature gas tube for introducing a relatively high temperature gas into the lower part of the furnace wall, a partition lattice located between the inlet tube and gas tubes to substantially horizontally extend within the furnace wall, a mask for covering an inlet portion of the exhaust tube at the top of the furnace wall, and a steam tube located at a position in the vicinity of an outlet of the outlet tube for introducing pressurized steam.

3. A method of activating a material as claimed in claim 1, wherein activating of said material is achieved by using rotary kiln type furnace which includes a cylindrical rotary furnace wall, a plurality of scooping blades disposed in equally spaced relationship around the inner wall surface of the furnace wall, a partition wall immovably held with a predetermined gradient independently of the rotation of the furnace wall to separate the interior of the furnace wall into a low temperature reaction chamber and a high temperature reaction chamber, a low temperature reaction gas tube and a discharge tube communicating with the low temperature reaction chamber, and a high temperature reaction gas tube and a discharge tube communicating with the high temperature reaction chamber.

4. A method of activating a material as claimed in claim 3, wherein said low temperature and high temperature atmospheres are obtained by continuously blowing the low temperature reaction gas into said low temperature reaction chamber and the high temperature activating gas into said high temperature reaction chamber.

5. A method of activating a material as claimed in claim 1, wherein activating of said material is achieved by using a rotary kiln type furnace which includes a cylindrical rotary furnace wall, a plurality of electrically conductive scooping blades disposed in equally spaced relationship around the inner wall surface of the furnace wall, a partition wall immovably held with a predetermined gradient independently of the rotation of the furnace wall to separate the interior of the furnace wall into an upper reaction chamber and a lower reaction chamber, and a reaction gas tube and a discharge tube communicating with the upper reaction chamber.

6. A method of activating a material as claimed in claim 5, wherein electricity is fed to the material held in the reaction chambers via the electric conductive scooping blades so that activation proceeds by temperature rise of the material.

7. A method of activating a material as claimed in claim 1, wherein activating of said material is achieved by using an elongated box type furnace which includes a primary carbonizing reaction chamber, a secondary carbonizing reaction chamber, an active reaction chamber and a water bath chamber arranged one after another from the upstream side, with each of said chambers separated by furnace walls and partition walls from an adjacent chamber.

8. A method of activating a material as claimed in claim 7, wherein an opposing pair of feeding rollers are arranged in said primary carbonizing reaction chamber, an opposing pair of feeding rollers are arranged in said secondary carbonizing reaction chamber and plural pairs of electrically conductive rollers are arranged in said active reaction chamber so that a band-like material to be activated is transported through said feeding rollers and said electrically conductive rollers.

9. A method for activating a material as claimed in claim 7, wherein two pairs of delivering rollers are disposed on the downstream side of the water bath chamber with a predetermined distance held therebetween, and a cutter is disposed between said delivering rollers.

10. A method of activating a material as claimed in claim 7, wherein electricity is fed to said material from the outside and heating is effected by temperature rise induced by the electric resistance of said material, and thereafter, said feeding of electricity is interrupted so as to allow the temperature of said material to be lowered by endothermic reaction of said active gas.

11. A method of activating a material as claimed in claim 10, wherein the material to be activated are selected from the group consisting of cellose-based material, acrylonitrile based synthesized material, lignin, pitch asphalt, phenol-based material, coal, plant material and zeolite.

12. A method of activating a material as claimed in claim 10, wherein steam, carbon dioxide or their mixture is used as an active gas.

* * * * *